(Model.)
V. J. SCHERB.
ANIMAL TRAP.
No. 531,571.  Patented Dec. 25, 1894.
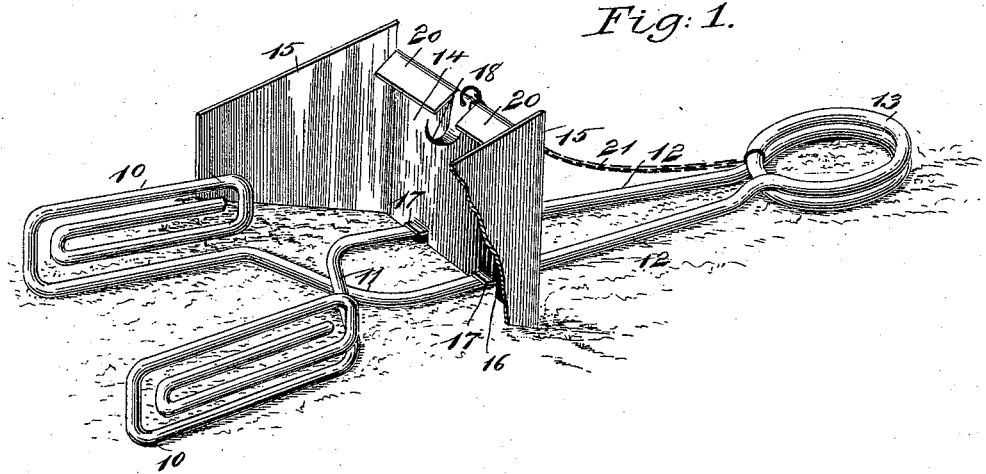
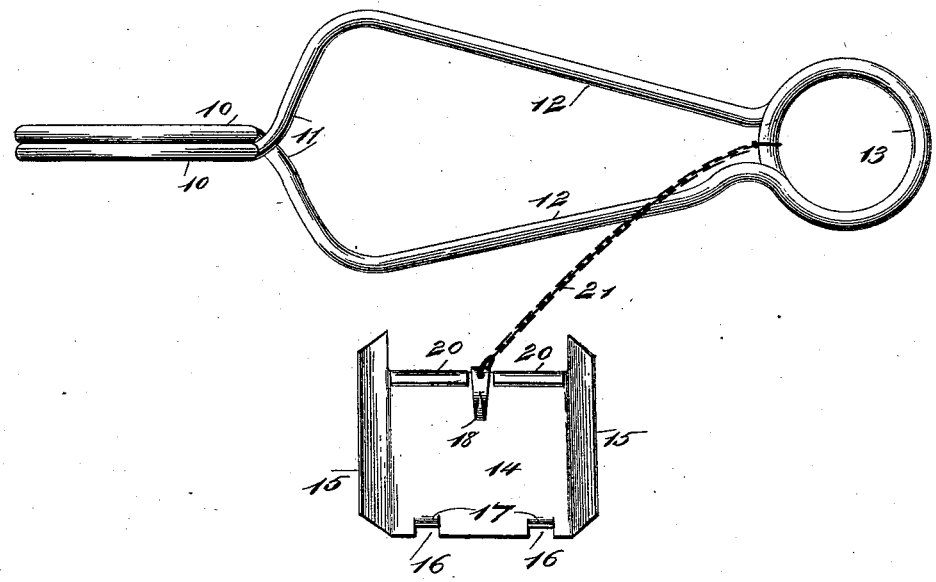
WITNESSES:
INVENTOR:
V. J. Scherb
By his Attorneys,
Munn & Co.

UNITED STATES PATENT OFFICE.

VICTOR J. SCHERB, OF NORTH PASADENA, CALIFORNIA.

ANIMAL-TRAP.

SPECIFICATION forming part of Letters Patent No. 531,571, dated December 25, 1894.

Application filed March 22, 1894. Serial No. 504,691. (Model.)

*To all whom it may concern:*

Be it known that I, VICTOR J. SCHERB, of North Pasadena, in the county of Los Angeles and State of California, have invented a new and Improved Animal-Trap, of which the following is a full, clear, and exact description.

My invention relates to improvements in that variety of traps which are adapted for use in catching mice and other small animals.

The ordinary traps are of such construction as to excite the suspicions of wary mice or other small animals, as the trap is of such an appearance that it at once suggests some trick and puts the animal on his guard. In other words the trap looks too much like a trap.

The object of my invention is to overcome this objection by producing a trap which is of such open structure that it does not resemble a trap, and has a pair of jaws to catch the animal, the jaws being arranged in such a way that the animal enters between them without fear.

A further object of my invention is to construct a trap which is very positive in its operation, is very simple in its construction, is very easily sprung, and is cheap.

To these ends my invention consists of certain features of construction and combinations of parts, which will be hereinafter described and claimed.

Reference is to be had to the accompanying drawings, forming a part of this specification, in which similar figures of reference indicate corresponding parts in both the views.

Figure 1 is a broken perspective view of the trap embodying my invention, showing it set ready for use; and Fig. 2 is a plan view of the trap with the jaws sprung together and the setting plate thrown to one side.

The trap is provided with two oppositely arranged flat jaws 10, which have at their inner ends arms 11 which cross each other and merge in the long and nearly parallel spring arms 12 which are united by a coil 13, and the wire forming the coil, the arms, and the jaws, is of spring material the tension of the coil being such as to normally press the jaws together. As illustrated, the jaws are formed by turning up the wire into the shape necessary to make the flat jaws, but my invention is not limited to such construction, as it will be understood that the jaws may be made in any suitable way and arranged at the ends of the spring arms.

The jaws are held apart by the plate 14 which is provided with side wings 15, so as to form it into a sort of box open on the front side and at the top, the plate having in its lower edge notches 16 which are adapted to receive the arms 12, and at the upper edges of the notches inwardly projecting lugs 17 are formed preferably by bending in the material which is cut away to form the notches, these lugs serving to give a better bearing for the plate on the arms. The lower edges of the side wings 15 are cut away or inclined downward from front to rear to permit the plate to readily rock and release the arms.

The plate 14 is provided at its upper edge and inner side with a depending bait hook 18 on which the trap bait is placed, and on each side of the hook are inturned and downwardly-extending inclined flanges 20 which prevent the bait from being reached from the top of the trap.

To guard against the displacement of the plate or box, a chain 21 or equivalent is attached to it and to the coil 13. When the trap is set the jaws 10 are spread, as illustrated in Fig. 1, and the plate or box placed over the arms 12 with the arms lying in the notches 16 and with the wings 15 projecting at the sides of the jaws 10.

The bait is placed upon the hook 18 and when a mouse or other animal tries to get the bait, he passes between the jaws 10 and into the box 14, 15, and by nibbling the bait tilts the plate 14 and this displaces the plate or box so that the arms 12 spring together and the mouse is caught and tightly squeezed between the jaws 10.

It will be seen by reference to Fig. 1, that the device is of such an open character that it is not very suggestive of a trap, and hence the animal enters it without suspicion and, if he touches the bait, is certain to be caught.

Having thus described my invention, I claim as new and desire to secure by Letters Patent—

1. An animal trap, comprising a pair of spring-pressed arms having jaws at their free ends, and a tripping plate to hold the jaws apart, the plate having a bait hook thereon, side wings adapted to lie adjacent to the jaws, and inturned flanges at the top, substantially as described.

2. An animal trap, comprising a pair of spring-pressed arms having jaws at their free ends, a tripping plate having notches in its lower edge to engage the arms, and provided with side wings cut away or inclined on their lower edges, and a bait hook on the tripping plate, substantially as described.

3. An animal trap, comprising a pair of cross arms terminating at one end in a coil and at their opposite ends in jaws, and a tripping plate having notches to engage the arms and hold the jaws open, the plate having a bait hook thereon, the said plate having side wings cut away or inclined on their lower edges substantially as described.

4. An animal trap, comprising a pair of spring cross arms merging at one end in a coil and coiled longitudinally and vertically at their free ends to form a pair of flat faced jaws 10, and a plate having notches in its lower edge to engage the arms and hold the jaws apart and a bait hook thereon, the said plate having side wings cut away or inclined on their lower edges substantially as described.

VICTOR J. SCHERB.

Witnesses:
JOHN MCDONALD,
J. SCHERB.